(12) United States Patent
Bernard et al.

(10) Patent No.: US 8,923,894 B1
(45) Date of Patent: Dec. 30, 2014

(54) DEVICE FOR AUTOMATED SIGNAL CAPTURE AND LOCATION BASED ON REAL-TIME ANALYSIS OF SIGNAL CHARACTERISTICS

(71) Applicant: Tektronix, Inc., Beaverton, OR (US)

(72) Inventors: Kyle L. Bernard, Tigard, OR (US); Man-Kit Yau, Tigard, OR (US)

(73) Assignee: Tektronix, Inc., Beaverton, OR (US)

( * ) Notice: Subject to any disclaimer, the term of this patent is extended or adjusted under 35 U.S.C. 154(b) by 7 days.

(21) Appl. No.: 13/957,189

(22) Filed: Aug. 1, 2013

(51) Int. Cl.
*H04W 24/00* (2009.01)
*G01S 5/10* (2006.01)

(52) U.S. Cl.
CPC ............................. *G01S 5/10* (2013.01)
USPC .............................................. 455/457

(58) Field of Classification Search
USPC .............................................. 455/457
See application file for complete search history.

(56) References Cited

U.S. PATENT DOCUMENTS

2010/0210361 A1* 8/2010 Crawford et al. ............... 463/36

* cited by examiner

*Primary Examiner* — Joel Ajayi
(74) *Attorney, Agent, or Firm* — Marger Johnson & McCollom PC

(57) ABSTRACT

An automated spectrum monitoring system may include a measurement device having a signal information display configured to visually present signal information pertaining to a signal, a real-time trigger detector configured to detect a trigger corresponding to the signal, and a mapping application configured to determine a geographic location of a source of the signal and visually present an indication of the geographic location.

13 Claims, 4 Drawing Sheets

DEVICE FOR AUTOMATED SIGNAL CAPTURE AND LOCATION BASED ON REAL-TIME ANALYSIS OF SIGNAL CHARACTERISTICS

TECHNICAL FIELD

This disclosure relates to signal processing systems and, more particularly, to tools and techniques for performing real-time analysis of certain signal characteristics.

BACKGROUND

Users engaged in spectrum monitoring generally have a need to discover, capture, analyze, and locate certain signals of interest. While instruments that are typically used today may be proficient in signal discovery, triggering, capture, and analysis, such instruments lack in support for signal location and, more generally, location awareness. While mapping functionality has been added to certain types of monitoring equipment to support GPS-based measurement location and mapping, initiation of signal capture, signal measurement, and determination of signal location is typically based on indicators that are not directly related to the signal of interest. The most commonly-used parameters, such as relative location change (e.g., every x meters), time interval (e.g., every x seconds), and manual operation (e.g., whenever the user performs a click operation), are the only available senses with regard to the capture, measurement, and location of the signal (or signals) of interest.

Accordingly, a need remains for systems and methods configured to perform automated signal capture and location determination.

SUMMARY

Certain embodiments of the disclosed technology are generally directed to methods by which signals can be detected and located using real-time signal analysis in conjunction with physical mapping functionality. Such embodiments may include mobile systems that are configured to perform automatic detection, measurement, and location (e.g., physical mapping, such as determining the geographic location/azimuth) of certain signals (e.g., rogue transmitters, interferers, standards violations) based on user-specified signal characteristics. Such systems may advantageously provide spectrum monitoring data that is dense in high-value targets.

Certain embodiments of the disclosed technology are generally directed to methods by which real-time triggers can be qualified based on their physical location. Such embodiments may include real-time spectrum analyzers that can be configured to detect signals based on any of a number of real-time triggering capabilities such as frequency mask, signal density, and signal power, for example. Triggers such as these can be forwarded to a location-aware mapping function that can be optionally coupled with a directional antenna in order to capture and measure the detected signal and also to map the physical location of the signal. These triggers may be further qualified by a user-specified area of interest. Mobile systems in which real-time triggers can be generated based on signal content and physical location may be advantageously used for or in conjunction with spectral monitoring operations, such as the detection of rogue transmitters, interferers, and standards violations, for example.

DETAILED DESCRIPTION

Embodiments of the disclosed technology are generally directed to tools and techniques by which general purpose, real-time signal discovery features, such as real-time triggers, for example, may be used to efficiently perform automated and efficient spectrum monitoring and signal location. The use of location-based triggering, in connection with spectrum monitoring instruments, may advantageously provide powerful triggering and signal capture capabilities for spectral monitoring operations.

The power of a signal monitoring system may be significantly increased by adding the capability for initiating signal capture and measurement along with signal location information based on the real-time content of the signal itself. Signal discovery mechanisms available in real-time spectrum analyzers (e.g., frequency mask trigger and DPX density trigger), when used in conjunction with a location-aware mapping function, may advantageously provide the functionality necessary to determine when to initiate signal measurement and determination of the signal location based on the actual signal characteristics that the user is interested in detecting.

Figure 1:
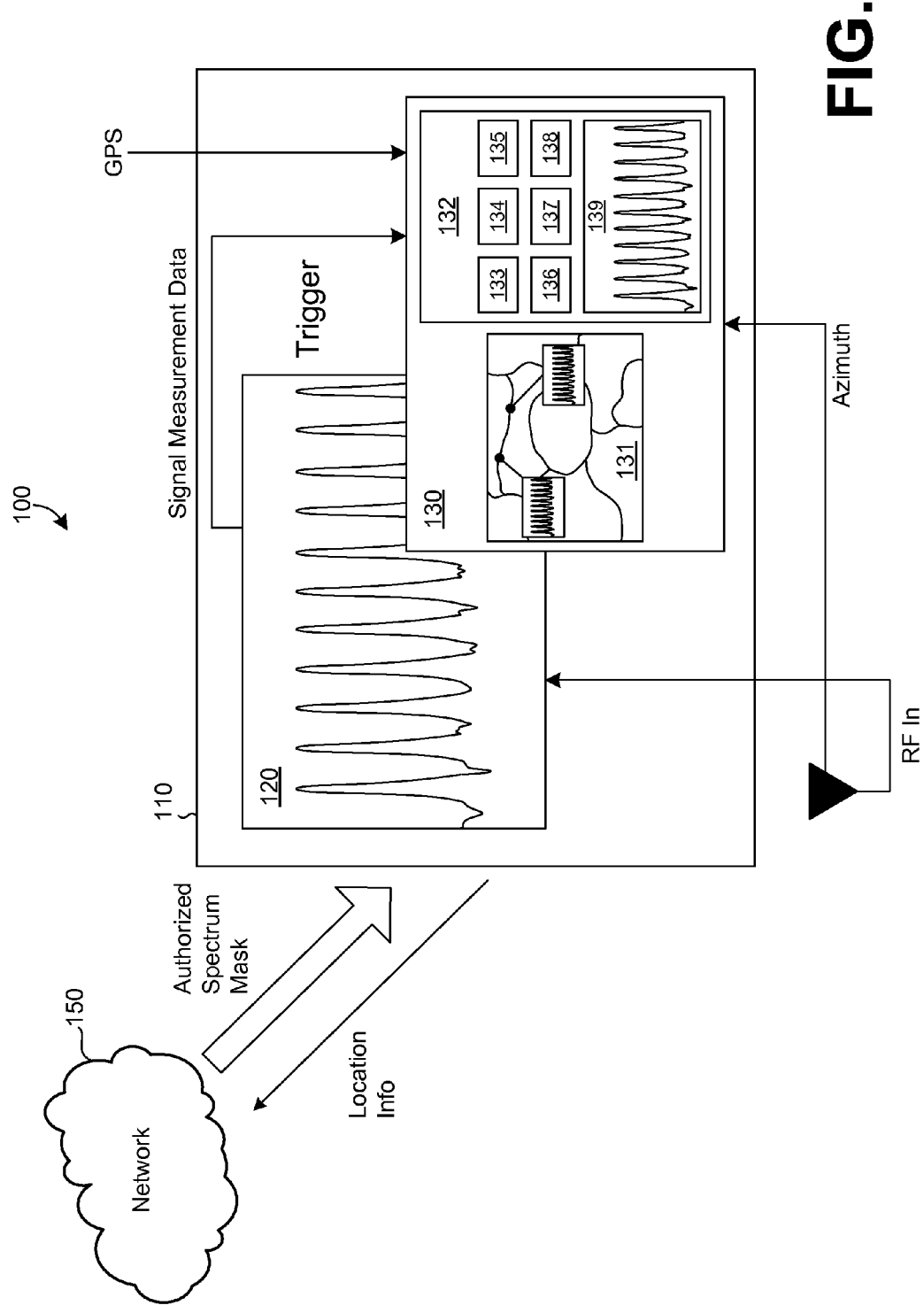
FIG. 1 illustrates an example of an automated spectrum monitoring system in accordance with certain embodiments of the disclosed technology.

FIG. 1 illustrates an example of an automated spectrum monitoring system 100 in accordance with certain embodiments of the disclosed technology. In the example, the system 100 includes a measurement instrument 110, e.g., a portable device, that may communicate with a network 150 and has a real-time trigger detector and location-aware measurement collection and mapping function. In the example, the measurement instrument 110 includes a signal information display portion 120 and a user interface 130. In certain embodiments, the entire system 100 is a mobile system.

The system 100 can advantageously allow a user to navigate over an area to be monitored, e.g., using an active map window 131 of the user interface 130, while the system 100 automatically detects, captures, measures, and locates signals, e.g., from an RF input, based on real-time evaluation of one or more user-specified signal characteristics as well as the actual physical location of the measurement device, e.g., as determined or otherwise received from a GPS input. The system 100 is thus capable of collecting spectral content information that is directly aligned with the monitoring interests of the user. Further, the measurement instrument 110 may optionally send location information to the network 150.

In the example, the user interface 130 includes a user interaction window 132 that has multiple buttons 133-138 and a thumbnail portion 139 that displays a smaller version of the signal information that is concurrently presented by the signal information display portion 120. Selection of one of the buttons 133-138 may cause a certain type of trigger, such as a frequency mask trigger or a DPX density trigger, to be applied. The map window 131 may visually indicate the geographic location of the detected signal.

Figure 2:
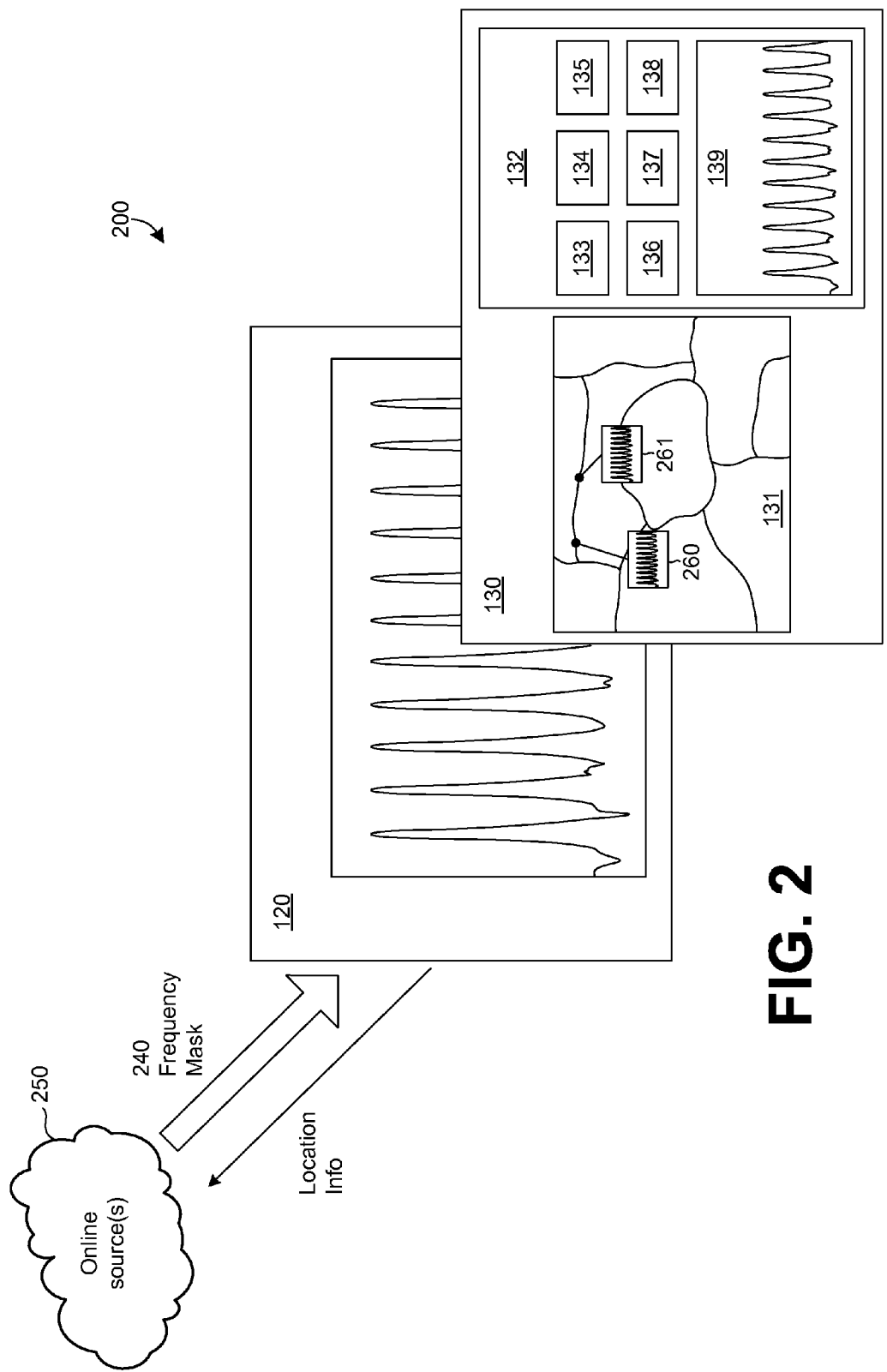
FIG. 2 illustrates an example in which a frequency mask trigger is used to detect and locate rogue signals in accordance with certain embodiments of the disclosed technology.

FIG. 2 illustrates an example 200 in which a frequency mask trigger is used to detect and locate rogue signals in accordance with certain embodiments of the disclosed technology. In the example, a frequency mask 240 specifying the authorized signals operating in the frequency band at the current location has been generated. Location-based masks, such as the frequency mask 240, of authorized signal transmissions can be automatically downloaded from one or more online source(s) 250 or optionally pre-loaded into the measurement instrument. Since the system in the example 200 is location-aware, such masks can be automatically updated as the location changes, thus further automating signal monitoring capabilities.

Detected signals that are operating outside of the frequency mask 240 are deemed unauthorized or rogue signals and may be visually presented as such, e.g., using corresponding icons or other indicators, within the map window 131 of the user interface 130. The condition may be detected using the frequency mask trigger function and the location-based trigger qualification to determine whether a valid trigger has been generated.

In the example 200, there are two signals operating outside the authorization mask. The resulting trigger is propagated to the mapping application, alerting it to obtain signal measurement data from the instrument and insert an indication of such into the active map 131 at the current location of the measurement instrument, e.g., using two icons 260 and 261 or other visual indicators. In the example, each of the icons 260 and 261 are thumbnail versions of the information that is concurrently presented by the signal information display portion 120.

Additional information including, but not limited to, the azimuth of the signal transmission may also be obtained, e.g., from the receiving antenna, and represented on the active map 131 using a directional arrow. Collection of the azimuth information may support triangulation for more precise location of the rogue signal source. Thus, signals of interest may be discovered, captured, analyzed, and located by way of an automated operation that is based on user-specified signal criteria.

In addition to frequency mask triggers, a real-time spectrum analyzer generally provides various other types of real-time triggers that can be used to detect signals. These triggers may also be used to provide signal capture, measure, and locate operations for spectrum monitoring.

Figure 3:
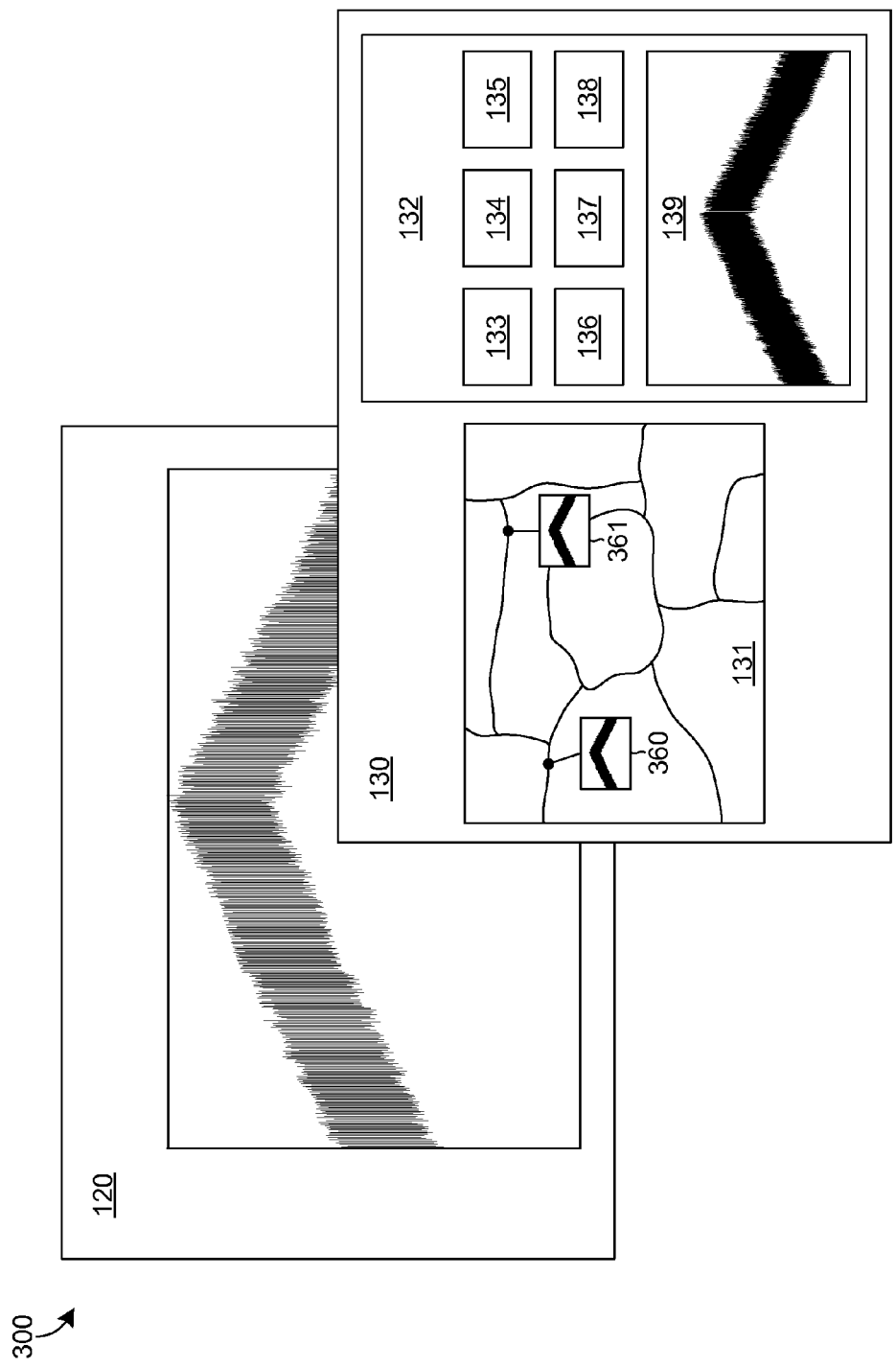
FIG. 3 illustrates an example in which a DPX density trigger is used to detect and locate one or more signals of interest in accordance with certain embodiments of the disclosed technology.

FIG. 3 illustrates an example 300 in which a DPX density trigger is used to detect and locate one or more signals of interest in accordance with certain embodiments of the disclosed technology. In the example, the DPX density trigger is being used to detect a signal characteristic and initiate capture, measure, and locate operations such as those described above.

As with the example 200 of FIG. 2, the resulting trigger in the example 300 may be propagated to the mapping application, alerting it to obtain signal measurement data from the instrument and insert an indication of such into the active map 131 at the current location of the measurement instrument, e.g., using two icons 360 and 361, e.g., that are or include thumbnail versions of the information that is concurrently presented by the signal information display portion 120, or other visual indicators.

Figure 4:
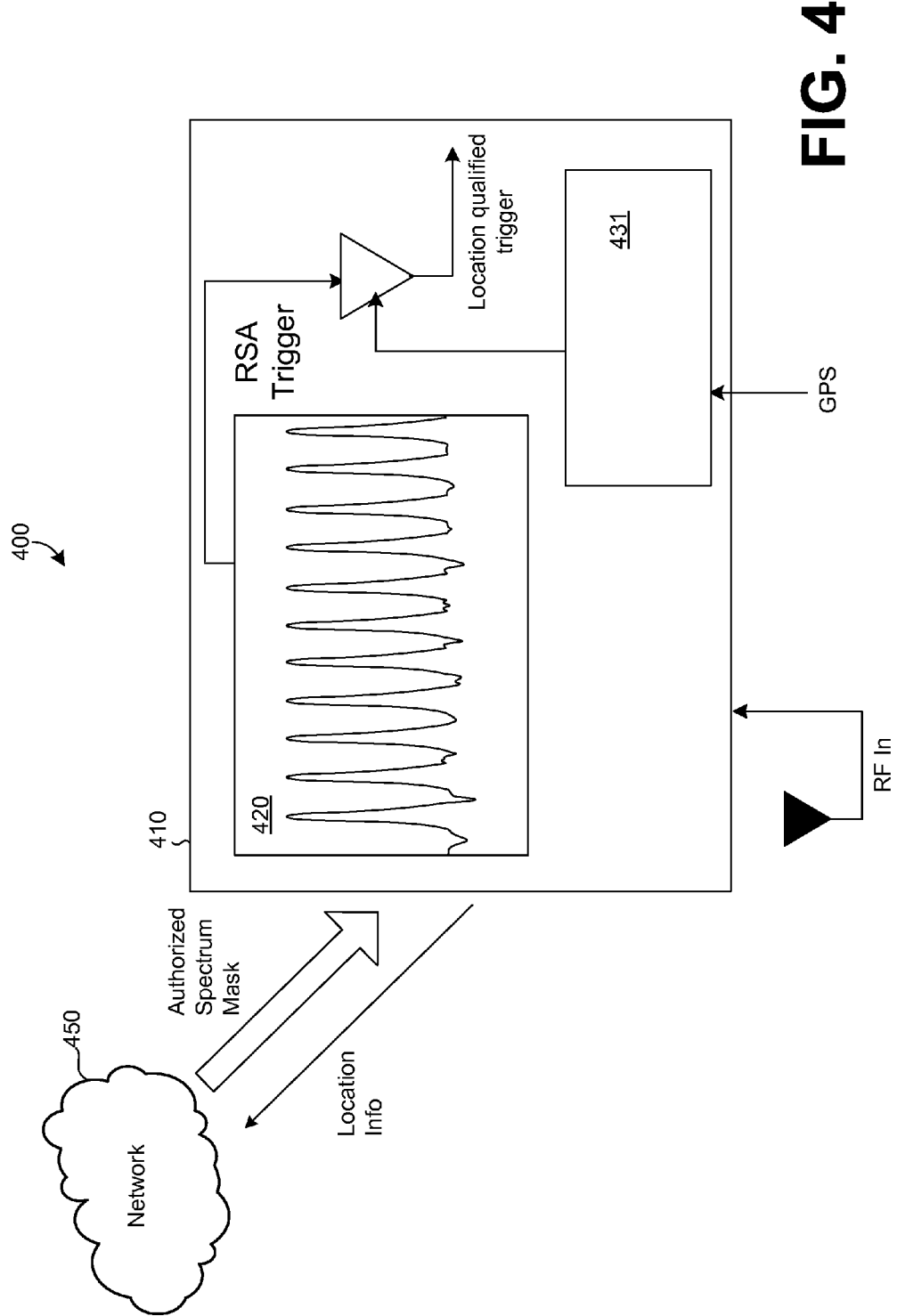
FIG. 4 illustrates an example of a location qualified trigger system in accordance with certain embodiments of the disclosed technology.

FIG. 4 illustrates an example of a location qualified trigger system 400 in accordance with certain embodiments of the disclosed technology. The system 400 is similar to the system 100 of FIGS. 1-3 in that the system 400 includes a measurement instrument 410, e.g., a portable device, that may communicate with a network 450 and includes a signal information display 420 and an active map window 431. As with the system 100 of FIGS. 1-3, the entire system 400 may be a mobile system.

The system 400 can advantageously allow a user to navigate over an area to be monitored, e.g., using the active map window 431, while the system 400 automatically detects, captures, measures, and locates signals, e.g., from an RF input, based on real-time evaluation of one or more user-specified signal characteristics as well as the actual physical location of the measurement device, e.g., as determined or otherwise received from a GPS input. The measurement instrument 410 may optionally send detected signal location information to the network 450. The example 400 further includes a location qualified trigger based on an RSA trigger and the determined geographic location, e.g., from the GPS input.

Having described and illustrated the principles of the invention with reference to illustrated embodiments, it will be recognized that the illustrated embodiments may be modified in arrangement and detail without departing from such principles, and may be combined in any desired manner. And although the foregoing discussion has focused on particular embodiments, other configurations are contemplated. In particular, even though expressions such as "according to an embodiment of the invention" or the like are used herein, these phrases are meant to generally reference embodiment possibilities, and are not intended to limit the invention to particular embodiment configurations. As used herein, these terms may reference the same or different embodiments that are combinable into other embodiments.

Consequently, in view of the wide variety of permutations to the embodiments described herein, this detailed description and accompanying material is intended to be illustrative only, and should not be taken as limiting the scope of the invention. What is claimed as the invention, therefore, is all such modifications as may come within the scope and spirit of the following claims and equivalents thereto.

We claim:

1. An automated spectrum monitoring system, comprising:
a measurement device having:
  a signal information display configured to visually present signal information pertaining to a signal;
  a real-time trigger detector configured to detect a trigger corresponding to the signal in which the trigger is a frequency mask trigger that is used to detect and locate at least one rogue signal;
  a mapping application configured to determine a geographic location of a source of the signal and visually present an indication of the geographic location; and
  a receiving antenna configured to provide an azimuth of the signal, in which the mapping application is further configured to visually present the azimuth of the signal.

2. The system of claim 1, further comprising an RF input configured to provide the signal to the measurement device.

3. The system of claim 1, further comprising a GPS input configured to provide an indication of a current physical location of the measurement device.

4. The system of claim 1, in which the mapping is further configured to allow a user to navigate over a geographic area to be monitored.

5. The system of claim 1, in which the signal information includes a measured strength of the signal.

6. The system of claim 1, in which the trigger is specified by a user.

7. The system of claim 1, in which the at least one rogue signal is operating outside of the frequency mask.

8. An automated spectrum monitoring system, comprising:
a measurement device having:

a signal information display configured to visually present signal information pertaining to a signal;

a real-time trigger detector configured to detect a trigger corresponding to the signal, in which the trigger is a DPX density trigger that is used to detect and locate at least one rogue signal;

a mapping application configured to determine a geographic location of a source of the signal and visually present an indication of the geographic location; and a receiving antenna configured to provide an azimuth of the signal, in which the mapping application is further configured to visually present the azimuth of the signal.

9. The system of claim 1, in which the real-time trigger detector is configured to detect the trigger based on application of a location-based mask of authorized transmissions.

10. The system of claim 9, in which the location-based mask of authorized transmissions is automatically downloaded from a network.

11. The system of claim 1, further comprising a network configured to receive from the measurement device the geographic location of the signal source.

12. The system of claim 1, further comprising a network configured to receive from the measurement device the physical location of the measurement device.

13. The system of claim 1, further comprising a trigger qualifying mechanism configured to qualify a trigger based on the geographic location of the signal source.

* * * * *